US011210830B2

(12) United States Patent
Gruenewald et al.

(10) Patent No.: US 11,210,830 B2
(45) Date of Patent: Dec. 28, 2021

(54) SYSTEM AND METHOD FOR ASSOCIATING IMAGES AND TEXT

(71) Applicant: LIFE COVENANT CHURCH, INC., Edmond, OK (US)

(72) Inventors: Robert L. Gruenewald, Edmond, OK (US); Terry D. Storch, Oklahoma City, OK (US); Matthew Sanders, Edmond, OK (US); Cory Albright, Helena, MT (US); Scott Bouma, Helena, MT (US)

(73) Assignee: LIFE COVENANT CHURCH, INC., Edmond, OK (US)

( * ) Notice: Subject to any disclaimer, the term of this patent is extended or adjusted under 35 U.S.C. 154(b) by 222 days.

(21) Appl. No.: 16/553,959

(22) Filed: Aug. 28, 2019

(65) Prior Publication Data

US 2020/0111244 A1 Apr. 9, 2020

Related U.S. Application Data

(60) Provisional application No. 62/741,703, filed on Oct. 5, 2018.

(51) Int. Cl.
*G06T 11/60* (2006.01)
*G06F 40/30* (2020.01)

(52) U.S. Cl.
CPC .............. *G06T 11/60* (2013.01); *G06F 40/30* (2020.01)

(58) Field of Classification Search
CPC ....... G06T 11/60; G06F 17/27; G06F 17/2785
See application file for complete search history.

(56) References Cited

U.S. PATENT DOCUMENTS

| 10,915,798 | B1* | 2/2021 | Zhang | G06K 9/00308 |
| 2011/0055713 | A1* | 3/2011 | Gruenewald | G06Q 10/00 |
| | | | | 715/738 |
| 2014/0019937 | A1* | 1/2014 | Clark | G06F 11/3672 |
| | | | | 717/123 |
| 2019/0108242 | A1* | 4/2019 | Liu | G06K 9/00671 |

* cited by examiner

*Primary Examiner* — Kevin Ky
(74) *Attorney, Agent, or Firm* — McAfee & Taft

(57) ABSTRACT

A system and method automatically associates an image and passage from a text. In the system and method, a user can choose or supply an image and the system and/or method will choose a limited selection of relevant word passages for the image from a relatively large volume of potential passages. The system and method utilize a computer system wherein a concept generator and a passage generator processes the content of the image so as to assign words to describe the content, then weight the descriptive words (tags) and assign passages based on the tags and weighting. The passages can be filtered so as to remove inappropriate passages.

15 Claims, 3 Drawing Sheets

SYSTEM AND METHOD FOR ASSOCIATING IMAGES AND TEXT

CROSS-REFERENCE TO RELATED APPLICATIONS

This application claims the benefit of U.S. Provisional Application No. 62/741,703 filed Oct. 5, 2018, which is hereby incorporated by reference.

TECHNICAL FIELD

This disclosure relates generally to the field of producing products having images and text which is appropriate to the image.

BACKGROUND

Products such as pictures, posters, cups, T-shirts and similar items having both an image and a word passage relevant to the image are popular and in high demand. This is especially true where both the image and word passage invoke an emotional response from the owners and/or viewers of the product. However, in the past it has been difficult and time consuming to associate relevant word passages with images. Such association has required significant human involvement and research to produce the product, or the product has had a relatively narrow selection of choices in order to limit the work required to come up with products with an emotional impact. Thus, a purchaser was limited to predesigned products, or the purchaser was limited to a relatively limited set of word passages for a relatively limited selection of images. Alternatively, the purchaser would have to expend the effort to both find a suitable image and find a suitable word passage.

SUMMARY

Consistent with the present disclosure, a method for automatically associating an image and a passage from a text is provided. The method comprises the steps of:
  obtaining a set of tags, wherein each of the tags describes at least one component in the content of the image;
  weighting the set of tags;
  obtaining a subset of tags based on the weighting of the set of tags;
  associating each tag in the subset of tags with one or more concepts to produce a concept set, wherein the concepts include at least one or more of an emotional state and a concept contained in the text;
  weighting the concept set;
  obtaining a concept subset based on the weighting of the concept set;
  associating each tag of the concept subset with at least one passage from the text based on the concepts associated with the tag to obtain a passage set;
  selecting at least one passage from the passage set; and
  associating the thus selected passage with the image to produce a product which includes the thus associated passage and image.

In the method, passages previously specified as inappropriate can be eliminated from the passage set prior to selecting the at least one passage.

In the embodiments of the method, the step of weighting the set of tags can weight the tags based on scarcity and specificity of the tags. Also, the step of weighting the concept can create a preference among the concepts.

In the embodiments of the method, the product can be at least one of an electronic processed image of a hard product. Further, when the product is a hard product, the associated passage and image are on the product and the hard product is at least one of a printed picture, a poster, a cup and a T-shirt.

In the embodiments of the method, the text can be the Bible and the concepts included in the concept set can include at least one biblical concept and include at least one emotional concept. In such embodiments, the weighting of the concept set can be in accordance with a set of rules based on associated biblical concepts and projected emotional states of the associated biblical concepts.

In a more specific embodiment, the method is for automatically associating an image and a biblical passage from the Bible. The method comprises the steps of:
  obtaining a set of tags, wherein each of the tags describes at least one component of the image;
  weighting the set of tags in accordance with a first set of rules based on scarcity and specificity of the tags;
  obtaining a subset of tags based on the weighting of the set of tags;
  associating each tag in the subset of tags with one or more concepts to produce a concept set, wherein the concepts included in the concept set include at least one biblical concept and include at least one emotional concept;
  weighting the concept set, wherein in the weighting of the concept set is in accordance with a second set of rules based on the associated biblical concepts and the projected emotional states of the associated biblical concepts;
  obtaining a concept subset based on the weighting of the concept set;
  associating each tag in the concept subset with at least one biblical passage based on the concepts associated with the tags to obtain a passage set;
  eliminating passages previously specified as inappropriate from the passage set to produce a filtered subset;
  selecting at least one passage from the filtered subset; and
  associating the thus selected passage with the image to produce a product having the selected passage and image.

Also consistent with this disclosure, a system for automatically associating an image and a passage from a text is provided. The system comprises a computer system, which can include a concept generator and a passage generator.

The concept generator selects a subset of tags, wherein each of the tags describes at least one component of the content of the image. The concept generator also associates specific subsets of tags to one or more concepts to generate a concept set.

The passage generator selects a subset of the concept set. Additionally, the passage generator associates the subset of the concepts with one or more passages from the text to produce a passage set containing the one or more passages. The passage generator then produces an output set comprising at least one passage associated with the image, wherein the passage is selected from the passage set.

The system generally will further include a product generator configured to produce a product having the passage and associated image.

In the system, the concepts can include at least one concept selected from an emotional state and a concept contained in the text.

The system can further include a first set of rules, which assigns a first weight to tags associated with the image as a function of scarcity and specificity of the tags. The concept generator can select the subset of tags based on the first weight.

The system can further comprise a second set of rules, which defines a second weighted set by assigning a second weight as a function of the concepts associated with the tags in the concept set. The passage generator can select a subset of the concept set based on the second weight.

In some embodiments, the passage generator utilizes a first filter to produce a filtered subset of the passage set by eliminating passages from the passage set based on criteria that define inappropriate passages. Also, the passage generator can utilize a second filter which produces the output set.

In a more specific embodiment, the system is for automatically associating an image and a biblical passage from the Bible. Similar to the above, the system comprises a computer system. There can be a first and second set of rules, a first and second filter, a concept generator and a passage generator in the computer system. However, in this embodiment, the concept generator associates each tag of the subset of tags with one or more concepts where the concepts include at least one biblical concept. Additionally, the second set of rules defines the second weighted set by assigning the second weight as a function of the concepts associated with the tags based on the associated biblical concept and a projected emotional impact of the concepts. Additionally, the passage generator associates the subset of the concepts with one or more biblical passages to produce the passage set containing the one or more biblical passages. Then, the second filter produces the output set comprising at least one biblical passage selected from the filtered subset. A biblical passage and image are then included in the product.

BRIEF DESCRIPTION OF THE DRAWINGS

The embodiments of the present disclosure are illustrated by way of example and not limited by the accompanying figures in which like reference numerals indicate similar elements and in which.

DETAILED DESCRIPTION

The detailed description that follows describes exemplary embodiments and the features disclosed are not intended to be limited to the expressly disclosed combination(s). Therefore, unless otherwise noted, features disclosed herein may be combined together to form additional combinations that were not otherwise shown for purposes of brevity.

Broadly, this disclosure relates to a system and method where a user can choose or supply an image and the system and/or method will choose a limited selection of relevant word passages for the image from a relatively large volume of potential passages. The system and method utilize a computer system wherein a first and second set of rules, a first and/or second filter, a concept generator and a passage generator process the content of the image so as to assign words to describe the content, then weight the descriptive words (tags) and assign passages based on the tags and weighting. The passages can be filtered so as to remove inappropriate passages.

In other words, the system and method limit down a large volume of potential passages to provide a selection of passages, which are relevant to the image and are likely to provide an emotional response especially when combined with the image. Generally, the large volume of potential passages can be a text or collection of texts such as the Bible, the works of William Shakespeare, a collection of poetry verses, a collection of literary works by various authors, and similar. To be especially useful, the text which provides the passage needs to be large enough to provide hundreds, thousands, tens of thousands, or even more quotes that might serve as relevant, thoughtful and emotionally impactful passages to associate with the images. While the system and methods of this disclosure are relevant to any such large volume of potential passages, the description will often refer to the Bible as the text for exemplary purposes. As used herein, the term "Bible" refers to the Christian scriptures, consisting of the Old and New Testaments and includes any of the various versions or translations. Those skilled in the art will understand that the concept however is applicable to other compilations of scriptural text—some of which may also be referred to commonly as being a bible or as Bible— such as the Jewish scriptures, consisting of the Torah or Law, the Prophets, and the Hagiographa or writings.

The present systems and methods overcome many of the deficiencies of the prior art and obtains its objectives by providing an integrated method embodied in computer software for use with a computer for the rapid, efficient selection of relevant and emotionally impactful passages such that the passages are relevant to a particular image and emotionally impactful, thereby allowing for rapid, creative, and emotionally impactful products produced in a very cost effective manner. The methods and systems herein described are operably integrated with computer software and hardware.

Figure 1:
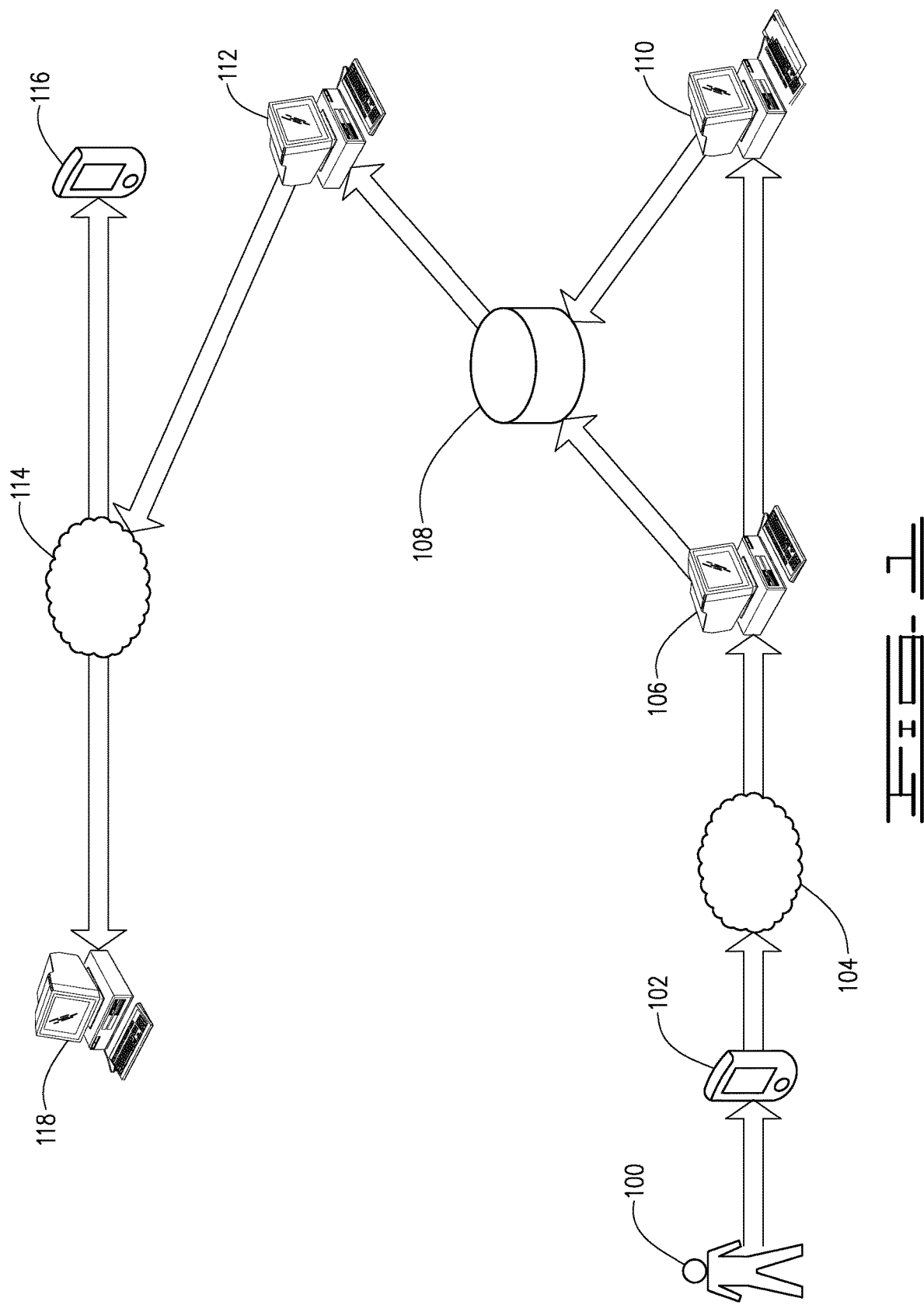
FIG. 1 is a diagram illustrating an overview of user interaction with a system for carrying out the method of one embodiment.

Turning now to FIG. 1, an embodiment of a system with which users can interact to carry out the current method is illustrated. Customer or user 100 can take an image with his digital camera or cell phone 102 to capture a digital image. The customer then uploads the digital source image through the internet 104 to be received at automatic processor 106.

Alternatively, customer 100 can choose an already existing image from previously captured digital images or from an image collection using a cell phone, tablet or computer. The chosen source image can then be uploaded through the internet 104 to automatic processor 106.

The source image can be stored in database 108. The source image can be processed by automated processor (image-passage engine) 110 to associate a passage with it, as further described below. The processed image can be stored in database 108. Upon production of the processed image (having both the source image and the passage) can be viewed through a computer terminal 112, which can be used to order or produce a product with the processed image. The product can be produced onsite at terminal 112 or can be sent over the internet 114 to a production facility 118. Information on the products status can be sent to the customer 116 via the internet or cellular system.

The image products can include an electronic processed image (source image with associated passage), or hard (non-electronic) products. Hard products are non-electronic products having the processed image on them, such as printed pictures, posters, cups, T-shirts, etc.

Figure 2:
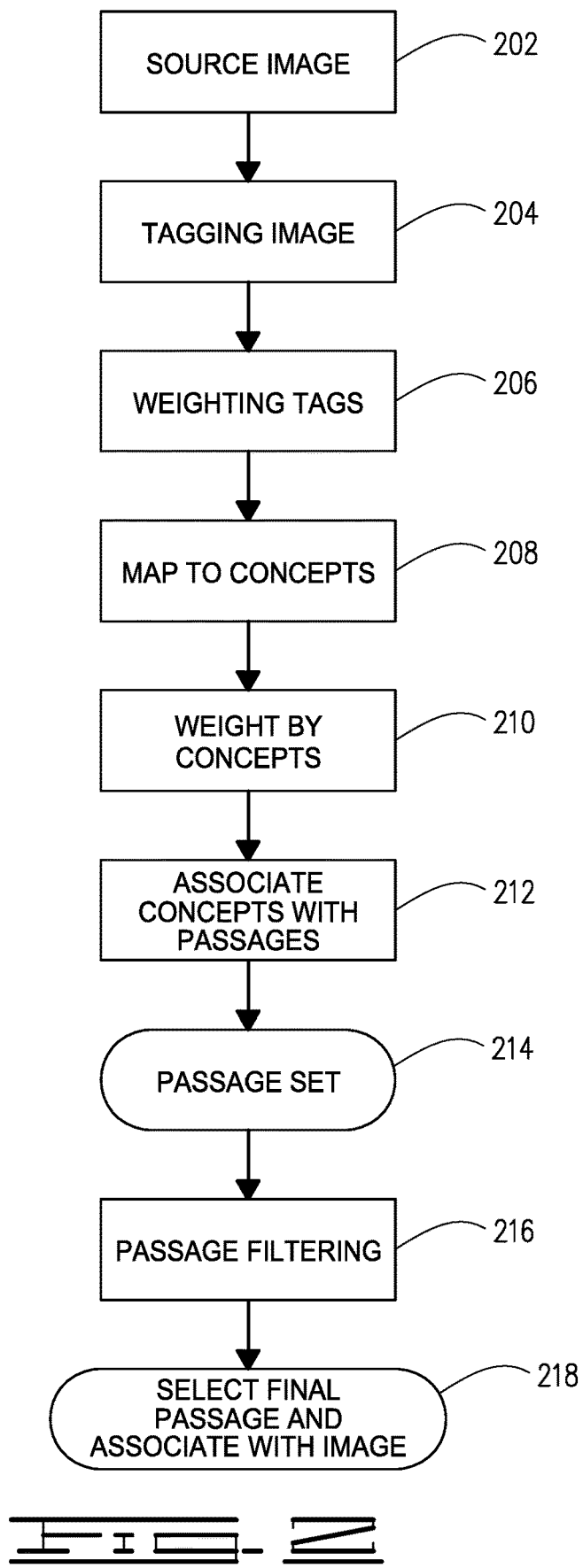
FIG. 2 is a flow chart illustrating a process in accordance with one embodiment of this disclosure.

Turning now to FIG. 2, the process and system for associating an image and a passage from a text, and for producing a product having the associated image and passage will now be further explained. A source image 202 is obtained and is analyzed and tagged with tags at step 204. Such image analysis detects individual objects, people, text, scenes and activities within an image and assigns appropriate words (e.g. "sailboat", "Eiffel Tower", "lion", etc.) as tags. The tags characterize the content of the image in words. For example, this can be accomplished through Google Cloud Vision API, Amazon Rekognition and/or similar software of the type commonly referred to as "machine vision". In some applications, the source image will be analyzed by multiple image analyzing packages, and the tags from these multiple analysis will be combined.

Thus, a set of tags associated with the source image is obtained with each of the tags describes at least one component of the content of the source image. After obtaining the tags, the tags are weighted so that selected components of the image are used preferentially in associating passages with the image. For example, the tags can be weighted in accordance with a first set of rules based on scarcity and specificity of the tags, as shown in step 206. The tags can be weighted for scarcity by assigning tags that represent less common components with a higher value or higher weight than tags that represent a more common component. For example, "Moon" might receive a lower weight than "asteroid" because there are more images of the moon than of asteroids. The tags can be weighted for specificity by assigning tags that refer to a component more specifically with a higher value or higher weight than tags that refer to a component more generally. For example, "sailboat" would receive a higher weight than the more general term "boat", and "Eiffel Tower" would receive a higher weight than "skyscraper".

Additionally in step 206, the tags are selected based on the weighting. For example, tags with a higher weight are selected to generate a subset of the tags. In some embodiments, a threshold weight can be selected and only those tags having a weight above the threshold can be included. Alternatively or in addition, a predetermined number of the tags can be selected with the highest weighted tags being selected first.

In step 208, each tag in the subset of tags is associated or mapped to one or more concepts to produce a concept set. Generally, the concepts will be ones that are designed to link the tags with the text from which the passage will be selected. Thus, the concepts will typically include at least one or more concept selected from an emotional state and a concept contained in the text. For example, the tag might be "laughing" and the concept would be the emotional state of "happiness". For example, if the text is the Bible then the concepts can be biblical concepts that would likely link to verses from the Bible. Thus, a tag of "bride" or "groom" could be associated with the biblical concept of "marriage". As may be realized, "marriage" would be linked to more verses in the Bible than "bride" or "groom" or would be linked to verses which would be more appropriate to associate with the source image.

In step 210, each tag in the concept set is weighted so that selected concepts are used preferentially in associating passages with the image. For example, the tags can be weighted in accordance with a second set of rules so as to create a preference among the concepts associated with each tag. For example, the data set can be weighted so that biblical concepts that provide for a greater number of passages and/or for passages with more impact (emotional impact, thought provoking impact, or similar) on people receive a higher weight. As per the example above, "bride" or "groom" might receive a lower weight than "marriage" because the concept of "marriage" would have more passages associated with it. Additionally, emotional concepts can be scripted so as to be mapped to passages. Thus, various emotional concepts associated with the image can be given higher weight than non-emotional concepts. In addition, the emotional concepts can be weighted so that different emotions have different weights. For example, if the text is the Bible, "love" might receive a very high weight as being a preferred concept because passages mapped to the love concept are preferred for associating with an image. On the other hand, "hate" or "anger" might be given low weight because passages mapped to these concepts are not preferred for associating with an image.

Also in step 210, the concept set is reduced by selecting those tags that have the highest weight based on the concept weights assigned to produce a concept subset, i.e. a set of tags associated with concepts that have a predetermined weight. For example, a threshold weight can be selected and only those tags having a weight above the threshold can be included. Alternatively or in addition, a predetermined number of the tags can be selected with the highest weighted tags being selected first.

In step 212, the concept subset is associated with one or more passages from the text to produce a passage set 214. The passages selected are ones relevant to the tags and associated concepts. The passages can be selected on the basis of one of the concepts associated with the tags in the concept set, or more typically, on the basis of a plurality of the concepts associated with tags in the concept set. Thus, an image resulting in a high weighting for the concepts of "love" and "cooperation" might return different passages from another image that results in a high weighting for the concepts of "love" and "friendship".

In step 216, the passages are further processed to eliminate undesirable passages and to select one or more passages to associate with the image. For example, a filter can be applied to the passages to eliminate passages predetermined to be inappropriate to produce a filtered subset. Typically, the filter compares the passage set with a predetermined set of passages that are not to be used and eliminates any passages in the passage set that are in the predetermined set of passages. For example, passages may be in the predetermined set because they have a very lower emotional impact or because they are confusing.

After filtering for inappropriate passages, one or more passages can be selected from the resulting filtered passage set and can be associated with the image. In some embodiments, the passages are selected by one or more criteria such as the concept weighting associated with the passage selected, popularity of the passage, number of concepts in the concept subset that resulted in a passage being selected, etc. In some embodiments, the concept set is not reduced in step 210 and the weighting of the concepts is used in step 218 to determine the final passages.

The one or more selected passages are associated with the image so as to produce a product having the selected passage(s) and image. For example, the product may be an electronic processed image (source image with associated passage), or other hard (non-electronic) products having the processed image on them such as printed pictures, posters, cups, T-shirts, etc. In some embodiments, the image and associated passage(s) will be sent to a production facility to produce the product with the image.

In some embodiments, the process further comprises analyzing the image (such as by use of machine vision software) so as to determine preferential placement of the passage in the associated image. The image is analyzed and the passage placed over the image in a position that does not block key or predetermined portions of the images. For example, the process can analyze the image so that the passage is not placed over people's faces, over animals, or so that the passage is preferentially placed in predetermined areas such as in portions of the image that show sky, grass or solid blocks of color.

Figure 3:
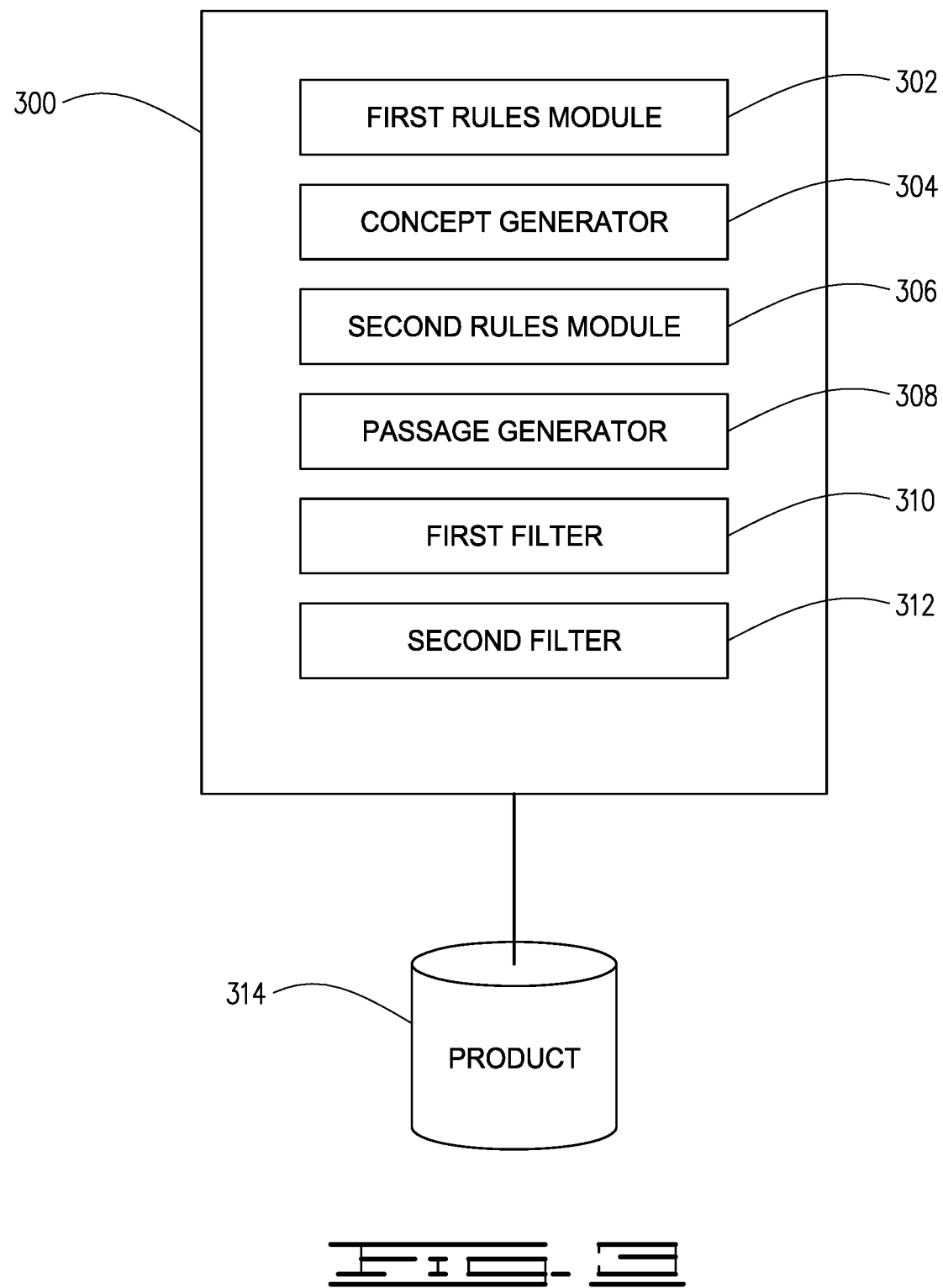
FIG. 3 is a block diagram illustrating an image-passage engine useful in a system for automatically associating an image and a passage from a text.

FIG. 3 is a block diagram illustrating an image-passage engine 300 useful in a system for automatically associating an image and a passage from a text. The engine includes a first rules module 302, a concept generator 304, a second rules module 306, a passage generator 308, a first filter 310 and a second filter 312. While illustrated as separate components, those skilled in the art will realize that the rule modules and filters will in many cases be components of the concept generator and/or passage generator. Additionally, the rules and filter can be predefined by a user or developed by the computer program such as through machine learning models.

First rules module 302 has a first set of predetermined rules for assigning a first weight to the tags of an image. First rules module 302 assigns the first weight to each tag associated by a predetermined function, such as by a function of scarcity and specificity of the tags.

Concept generator 304 selects a subset of tags based on the first weight. Concept generator 304 also can associate one or more concepts with each tag in the subset of tags to produce the concept set.

Second rules module 306 has a second set of predetermined rules for assigning a second weight to the tags in the concept set. Second rules module 306 assigns the second weight by a predetermined function based on the concepts associated with the tags.

Passage generator 308 selects a subset of the concept set based on the second weight. Additionally, the passage generator can associate the subset of the concepts with one or more passages from the text to produce a passage set containing the one or more passages.

First filter 310 filters the passages based on criteria that define inappropriate passages. For example, first filter 310 can compare the passages to a list of inappropriate passages and remove those on the list from the passage set. Additionally, engine 300 can include a second filter 312 which further filters the passages based on additional criteria, such as the weights assigned to the concepts producing the passages, popularity of the passages, or emotional impact of the passages. The second filter 312 produces an output set comprising at least one passage, which is associated with the image by engine 300. Engine 300 can further be connected to a product generator 314. Product generator 314 takes the associated passage(s) and image and includes them on a product or incorporates them into a product. Product generator can be, for example, a photo printer, various devices for painting, printing or transferring images and words to cups, t-shirts and the like, an embroidery machine, or similar machines.

Further, the engine 300 can be configured to analyze the image so as to determine preferential placement of the passage in the associated image. The image is analyzed and the passage placed over the image in a position that does not block key or predetermined portions of the images.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

We claim:

1. A method for automatically associating an image and a passage from a text, the method comprising:
    obtaining a set of tags, wherein each of the tags describes at least one component in the content of the image;
    weighting the set of tags;
    obtaining a subset of tags based on the weighting of the set of tags;
    associating each tag in the subset of tags with one or more concepts to produce a concept set, wherein the concepts include at least one or more of an emotional state and a concept contained in the text;
    weighting the concept set;
    obtaining a concept subset based on the weighting of the concept set;
    associating each tag of the concept subset with at least one passage from the text based on the concepts associated with the tag to obtain a passage set;
    selecting at least one passage from the passage set; and
    associating the thus selected passage with the image to produce a product which includes the thus associated passage and image.

2. The method of claim 1, further comprising eliminating passages previously specified as inappropriate from the passage set prior to selecting the at least one passage.

3. The method of claim 1, wherein the step of weighting the set of tags weights the tags based on scarcity and specificity of the tags.

4. The method of claim 1, wherein the step of weighting the concept creates a preference among the concepts.

5. The method of claim 1, wherein the product is at least one of an electronic processed image of a hard product.

6. The method of claim 5, wherein the product is a hard product, wherein the associated passage and image are on the product and the hard product is at least one of a printed picture, a poster, a cup and a T-shirt.

7. The method of claim 1, wherein the text is the Bible and the concepts included in the concept set include at least one biblical concept and include at least one emotional concept.

8. The method of claim 7, wherein the weighting of the concept set is in accordance with a set of rules based on associated biblical concepts and projected emotional states of the associated biblical concepts.

9. A method for automatically associating an image and a biblical passage from the Bible, the method comprises the steps of:
    obtaining a set of tags, wherein each of the tags describes at least one component of the image;
    weighting the set of tags in accordance with a first set of rules based on scarcity and specificity of the tags;
    obtaining a subset of tags based on the weighting of the set of tags;
    associating each tag in the subset of tags with one or more concepts to produce a concept set, wherein the concepts included in the concept set include at least one biblical concept and include at least one emotional concept to produce associated biblical concepts and associated emotional concepts;
    weighting the concept set, wherein the weighting of the concept set is in accordance with a second set of rules based on the associated biblical concepts and projected emotional states of the associated biblical concepts;
    obtaining a concept subset based on the weighting of the concept set;
    associating each tag in the concept subset with at least one biblical passage based on the concepts associated with the tags to obtain a passage set;

eliminating passages previously specified as inappropriate from the passage set to produce a filtered subset;
selecting at least one passage from the filtered subset; and
associating the thus selected passage with the image to produce a product which includes the thus associated passage and image.

10. A system for automatically associating an image and a passage from a text, the system comprising:
a computer system having;
   a concept generator which selects a subset of tags, wherein each of the tags describes at least one component of the content of the image, and wherein the concept generator associates one or more concepts with each tag in the subset of tags to produce a concept set; and
   a passage generator which selects a subset of the concept set, and which associates the subset of the concepts set with one or more passages from the text to produce a passage set containing the one or more passages, and wherein the passage generator produces an output set comprising at least one passage associated with the image, wherein the passage is selected from the passage set; and
   a product generator configured to produce a product having the passage and associated image.

11. The system of claim 10, wherein the concepts include at least one concept selected from an emotional state and a concept contained in the text.

12. The system of claim 11, further comprising a first set of rules, which assigns a first weight to tags associated with the image as a function of scarcity and specificity of the tags, and wherein the concept generator selects the subset of tags based on the first weight.

13. The system of claim 12, further comprising a second set of rules, which defines a second weighted set by assigning a second weight as a function of the concepts associated with the tags in the concept set, and wherein the passage generator selects a subset of the concept set based on the second weight.

14. The system of claim 13, wherein the passage generator utilizes a first filter to eliminate passages from the passage set based on criteria that define inappropriate passages.

15. The system of claim 14, wherein the text is the bible and the system is for automatically associating an image and a biblical passage from the Bible, and wherein the concept generator associates each tag of the subset of tags with one or more concepts where the concepts include at least one biblical concept, the second set of rules defines the second weighted set by assigning the second weight as a function of the concepts associated with the tags based on the associated biblical concept and a projected emotional impact of the concepts, and the passage generator associates the subset of the concepts with one or more biblical passages to produce the passage set containing the one or more biblical passages.

* * * * *